United States Patent
Sirdey et al.

(10) Patent No.: US 10,754,907 B2
(45) Date of Patent: Aug. 25, 2020

(54) METHOD FOR CONFIDENTIALLY QUERYING A LOCATION-BASED SERVICE BY HOMOMORPHING CRYPTOGRAPHY

(71) Applicant: COMMISSARIAT A L'ENERGIE ATOMIQUE ET AUX ENERGIES ALTERNATIVES, Paris (FR)

(72) Inventors: Renaud Sirdey, Cernay-la-Ville (FR); Oana Stan, Massy (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 81 days.

(21) Appl. No.: 15/756,623

(22) PCT Filed: Sep. 1, 2016

(86) PCT No.: PCT/EP2016/070570
§ 371 (c)(1),
(2) Date: Mar. 1, 2018

(87) PCT Pub. No.: WO2017/037151
PCT Pub. Date: Mar. 9, 2017

(65) Prior Publication Data
US 2018/0267981 A1    Sep. 20, 2018

(30) Foreign Application Priority Data
Sep. 3, 2015 (FR) .................................... 15 58159

(51) Int. Cl.
*G06F 17/16* (2006.01)
*G06Q 10/04* (2012.01)
(Continued)

(52) U.S. Cl.
CPC ....... *G06F 16/9537* (2019.01); *G01C 21/343* (2013.01); *G01C 21/3476* (2013.01);
(Continued)

(58) Field of Classification Search
None
See application file for complete search history.

(56) References Cited

U.S. PATENT DOCUMENTS

| 2007/0087756 | A1* | 4/2007 | Hoffberg | G06Q 10/0631 455/450 |
| 2017/0053282 | A1* | 2/2017 | Olumofin | G06Q 20/3224 |
| 2017/0103227 | A1* | 4/2017 | Kerschbaum | H04L 9/0819 |

OTHER PUBLICATIONS

Samanthula et al., "Privacy-Preserving Protocols for Shortest Path Discovery over Outsourced Encrypted Data", , 2015 IEEE 16th International Conference on Information Reuse and Integration, Aug. 13, 2015, pp. 427-434.*

(Continued)

*Primary Examiner* — Thomas G Black
*Assistant Examiner* — Demetra R Smith-Stewart
(74) *Attorney, Agent, or Firm* — Oblon, McClelland, Maier & Neustadt, L.L.P.

(57) ABSTRACT

A method allowing a user confidentially to query a server including a database. The user builds, from an index of a desired entry, a vector encrypted by a homomorphic probabilistic cryptosystem, and transmits a request having the vector as an argument to the server. The server performs a scalar product between the vector of entries of the database and returns the result to the user. The user decrypts the scalar product to obtain the desired entry. The method can be used for example for querying a location-based service and for navigation by concealed routes.

9 Claims, 3 Drawing Sheets

(51) Int. Cl.
    *G01C 21/34*          (2006.01)
    *G06F 16/9537*      (2019.01)
    *H04L 9/00*           (2006.01)
    *G09C 1/00*           (2006.01)

(52) U.S. Cl.
    CPC ........... *G06F 17/16* (2013.01); *G06Q 10/047* (2013.01); *G09C 1/00* (2013.01); *H04L 9/008* (2013.01); *H04L 2209/42* (2013.01)

(56) References Cited

OTHER PUBLICATIONS

International Search Report dated Jan. 23, 2017, in PCT/EP2016/070570, filed Sep. 1, 2016.
Samanthula, B., et al. "Privacy-Preserving Protocols for Shortest Path Discovery over Outsourced Encrypted Graph Data", 2015 IEEE 16th International Conference on Information Reuse and Integration, XP 032798221, Aug. 13, 2015, pp. 427-434.
Ghinita, G., et al., "Private Queries in Location Based Services: Anonymizers are not Necessary", Proc. of Sigmod 2008, 2008, 12 pages.

\* cited by examiner

METHOD FOR CONFIDENTIALLY QUERYING A LOCATION-BASED SERVICE BY HOMOMORPHING CRYPTOGRAPHY

TECHNICAL FIELD

The present invention relates in particular to the field of location based services (LBS). An important application of the invention relates to the field of navigation by concealed routes.

STATE OF PRIOR ART

The location based services (LBS) have experienced a spectacular development in recent years because third and fourth generation smart mobile terminals are common place. From LBS services, searching for points of interest (POI), locating a user, or even searching for routes can be mentioned.

LBS services have in common to provide a piece of information depending on the user's position. Since the user's position is a sensitive piece of information, the services in question should be able to guarantee confidentiality and respect of the user's privacy. This requirement is all the more necessary that the LBS service can be offered in a delocalised manner by means of a cloud computing platform.

Different schemes have been suggested to ensure confidentiality of the user's locating data: resorting to a Trusted Third Party (TTP), half-distributed scheme involving at least two independent entities, client-server architecture, collaborative scheme with distributed confidentiality within an ad hoc network.

The client-server architecture has the advantage of not resorting to a trusted third party. However, preserving confidentiality then requires that the server, considered as unreliable a priori, is able to provide the piece of information requested by the user without revealing his/her position to it. Such a confidential querying method, in other words without the possibility for the service provider to access to the clear argument of the user's request, herein his/her position, is called Private Information Retrieval (PIR) method.

FIG. 1 illustrates the principle of a PIR method in a client-server architecture.

The server of a LBS service provider, 110, has a database, 130 which contains N records, that is $O[1, \ldots, N]$, each record consisting of an information element.

A user (or client) 120 sends a request $Q(i)$ where i is an index parameterising the user's position, he/she actually wishing to obtain the information element $O_i$ of the database. The request $Q(i)$ is encrypted such that it is impossible for the server to retrieve the value of index i. The server 110 calculates from the table O and from the request $Q(i)$ a result $R(O,Q(i))$ by means of a mathematical transformation and this result is sent back to the user. He/she decrypts the result $R(O,Q(i))$ to obtain the element $O_i$.

An exemplary PIR method will be found in the paper by G. Ghinita and al. entitled "Private queries in Location Based Services: anonymizers are not necessary" issued in Proc. of Sigmod 2008, pages 121-132. This PIR method ensures confidentiality of the user's position by virtue of the intractability of the quadratic residuosity problem according to which it is extremely difficult to determine whether an integer is a quadratic residue modulo n, where $n=q_1 q_2$ is an integer with $q_1, q_2$ large prime numbers, without knowing $q_1$ and $q_2$. The PIR method described in this paper uses a table in which each cell corresponds to a position and contains the list of the POIs closest to that position. Thus, it enables a user to obtain the closest POIs to him/her.

Although this PIR method enables a high confidentiality degree to be achieved, it is relatively complex and requires a great number of calculations to be performed.

The paper by S. Bhatath and al. entitled "Privacy-preserving protocols for shortest path discovery over outsourced encrypted data graph data" issued in IEEE Int'l Conference on information reuse and integration, Aug. 13, 2015, pages 427-434, describes a confidential navigation method by querying a database. However, in this method, the server does not calculate the optimum path, this task is allotted to the user who generally has reduced computing resources. Further, the optimum path is incrementally determined, which increases the navigation response time accordingly.

The purpose of the present invention is consequently to provide a method for confidentially querying a location based service provider, in particular a navigation service, which is simpler than that of prior art while guarantying a high confidentiality degree.

DISCLOSURE OF THE INVENTION

The present invention is defined by a confidential navigation method of a user within a given geographical area, by confidentially querying a server equipped with a database, according to which:

said geographical area contains a plurality of reference points, each couple of reference points being associated with an index;

said database contains for each index corresponding to a couple of reference points, a record of an optimum path as a predetermined criterion between these points, the optimum path being defined by a list of indices of reference points $(k_1, \ldots, k_Q)$ through which this path passes;

the user determines the respective indices $(i_A, i_B)$ of a couple of starting, A, and destination, B points, and deduces an index i corresponding to the couple of points (A,B) therefrom;

the user builds a vector $V_i$ all the elements of which except for that of the index i are ciphertexts of zero and the element of index i of which is a ciphertext of one, the encryption being made by means of a probabilistic cryptosystem satisfying the following homomorphic properties:

$$Dec_{sk}[Enc_{pk}(a,r) \oplus Enc_{pk}(b,r)] = a+b$$

$$Dec_{sk}[a \otimes Enc_{pk}(b,r)] = a \cdot b$$

where (sk,pk) is a pair of private and public keys of the user, $Enc_{pk}$ is an encryption operation by means of the public key, $Dec_{sk}$ is a decryption operation using the private key, a,b are plaintexts, $\oplus$ is an operator on the ciphertext space and $\otimes$ is an operator between the plaintext space and the ciphertext space;

the user transmits a request having the vector $V_i$ as an argument to the server;

the server performs a scalar product between the record vector O and the vector $V_i$ and returns the scalar product $C_i$ thus obtained to the user;

the user decrypts the scalar product $C_i$ to obtain the record of index i of the database, said record giving the optimum path between points A and B.

The cryptosystem can be chosen for example from the Paillier cryptosystem, the Regev cryptosystem and the Fan-Vercauteren cryptosystem.

In a dynamic use, the server updates the optimum paths between the reference points of the geographical area periodically or upon request.

Advantageously, the server stores a plurality of vectors $V_i$ relating to a plurality M of couples of favourite starting and destination points.

In this case, the user transmits to the server a sub-request specifying from the plurality of couples of favourite points, the couple for which he/she desires to obtain a route and that the server returns the scalar product between the record vector O and the vector $V_i$ corresponding to this sub-request.

Alternatively, the server periodically performs a scalar product calculation between the vectors $V_i$ relating to the couples of favourite points and the record vector O, the server building a vector C of the scalar products thus obtained.

In this case, the user builds a second vector $U_j$ of the size M all the elements of which except for that of an index j are ciphertexts of zero and the element of index j of which is a ciphertext of one, the encryption being made by means of said cryptosystem, the user transmits a sub-request having the second vector $U_j$ as an argument to the server.

The server advantageously performs a second scalar product between the vector C and the vector $U_j$ and returns the second scalar product thus obtained to the user.

The user thereby decrypts the second scalar product to obtain the scalar product $C_j$, and then decrypts the first scalar product to obtain the route for the couple of desired points.

BRIEF DESCRIPTION OF THE DRAWINGS

Further characteristics and advantages of the invention will appear upon reading a preferential embodiment of the invention in reference to the appended figures among which.

DETAILED DISCLOSURE OF PARTICULAR EMBODIMENTS

Figure 1:
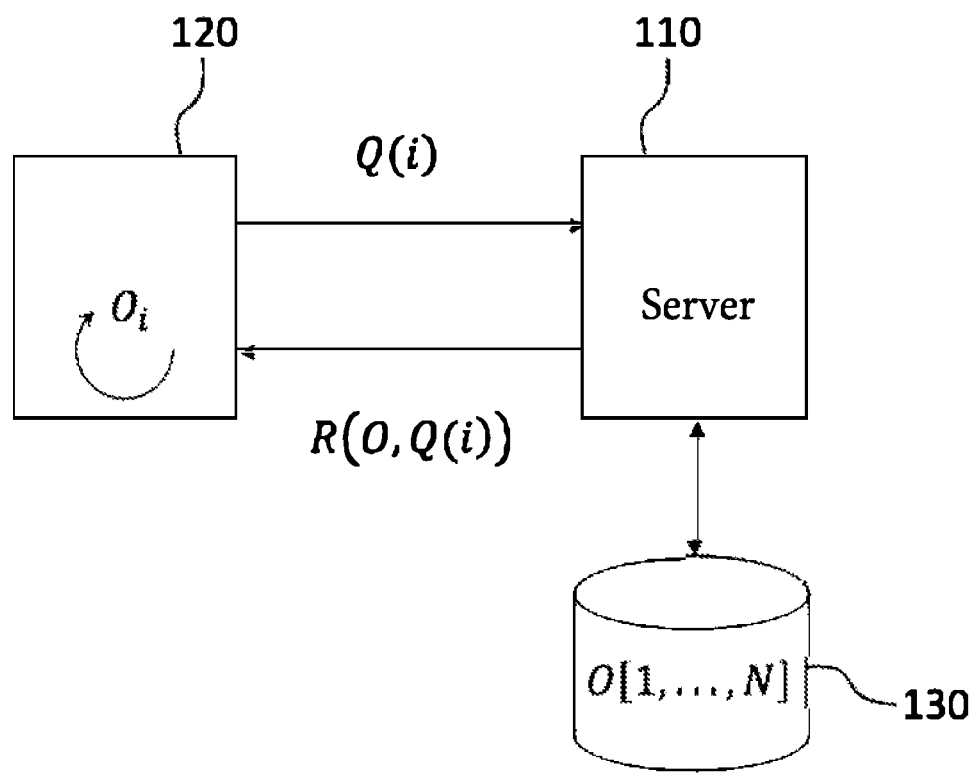
FIG. 1 represents the principle of a PIR method known to the state of the art.

The confidential querying method according to the present invention will be described hereinafter within the context of a client-server architecture as previously described in connection with FIG. 1. In a particular embodiment of the invention, the server will provide a location-based service (LBS), in particular, searching for points of interest (POI) or a navigation service with concealed routes as described in further detail later. However, in its most general form, the invention could find application in other types of services, for example a medical record consultation service.

Regardless of the type of service being contemplated, the server is equipped with a database containing a plurality of records indexed with an index i. Thus, the database can be considered as a vector $O=(O_1, \ldots O_N)^T$, each element of the vector corresponding to a record. Without loss of generality, it will be supposed in the following that the records are represented by elements of $Z_{n^2}=Z/n^2Z$ where $n=pq$ is an integer, being a product of two (large) prime numbers p and q.

The idea underlying the invention is to use a probabilistic cryptosystem having particular homomorphic properties enabling a record to be extracted using a simple scalar product.

It is first reminded that a probabilistic encryption $Enc(\cdot,r)$ is an encryption depending on a random parameter r. The encryption of a plaintext message m can thus yield different encrypted messages $Enc(m,r)$ according to the value taken by the parameter r. However, regardless of the value taken by this parameter, the decryption of $Enc(m,r)$ always brings back the plaintext message m. In other words, there is a decryption function Dec such that:

$$Dec(Enc(m,r))=m \quad (1).$$

Then, it is reminded that a homomorphic encryption is an asymmetric encryption $Enc_{pk}$ (of a public key pk) satisfying the following property:

$$Enc_{pk}:X \to Y$$

$$\forall a,b \in X, Enc_{pk}(a+b)=Enc_{pk}(a) \oplus Enc_{pk}(b) \quad (2)$$

where X is the space of plaintext messages (more simply called plaintext space) and Y is the space of encrypted messages (more simply called ciphertext space), + an additive operation in the plaintext space providing X with a group structure, $\oplus$ is an operation in the ciphertext space providing Y with a group structure. Thus, it is understood that the application $Enc_{pk}$ of (X,+) in (Y,$\oplus$) is a group homomorphism. If $Dec_{sk}$ is the decryption function corresponding to $Enc_{pk}$ (where sk is the user's secrete key), the property (1) can be alternatively expressed as:

$$Dec_{sk}[Enc_{pk}(a) \oplus Enc_{pk}(b)]=a+b \quad (3).$$

In other words, it is possible to perform an additive operation between two plaintexts from a corresponding operation between their ciphertexts.

In the following, it will be supposed that $X=Z_n=Z/nZ$ and that $Y=Z_{n^2}=Z/n^2Z$.

From above, as a result, there is a homomorphic probabilistic encryption method $Enc_{pk}(\cdot,r)$ satisfying the following relationship:

$$Dec_{sk}[Enc_{pk}(a,r) \oplus Enc_{pk}(b,r)]=a+b \quad (4)$$

where it has been assumed as previously that r is a random parameter, pk is the encryption public key and sk is the decryption secrete key. The messages a and b are plaintext messages.

In addition to the additive homomorphism property expressed in (4), it is supposed that the encryption method satisfies the following property:

$$Dec_{sk}[a \otimes Enc_{pk}(b,r)]=a \cdot b \quad (5)$$

where $\otimes$ is an external operation of $X \times Y \to Y$ and where $\cdot$ is a multiplicative operation in Y. In other words, it is possible to perform a multiplicative operation between two plaintexts from the ciphertext of one of them. It is to be noted that the relationship (5) is not properly a homomorphism property insofar as the starting set is the Cartesian product X×Y. It is thus not necessary that the cryptosystem is of the FHE (Fully Homomorphic Encryption) type.

Probabilistic cryptosystems satisfying the conditions (4) and (5), in particular the Paillier cryptosystem, are known, in which the encryption of a message $0 \leq m < n$ is obtained by:

$$c=Enc(m,r)=(m,r)^m \cdot r \bmod n^2 \quad (6)$$

where r is a random integer such that $0 < r < n$, $n=pq$ is the public key, p,q being two large-size prime numbers.

Reciprocally, the decryption of a ciphertext c is obtained by:

$$m = \frac{(c.r^{-n} \mod n^2) - 1}{n} \quad (7)$$

where $r=(n^{-1} \mod \phi) \mod n$ and $\phi=(p-1)(q-1)$ is the private key.

In view of the definition (6), the Paillier cryptosystem satisfies the following properties:

$$Dec(Enc(a,r)Enc(b,r))=a+b \quad (8)$$

and $$Dec(Enc(b,r)^a)=a+b \quad (9).$$

By comparing the relationships (4)-(5) with the relationships (8)-(9), it is understood that the operations $\oplus$ and $\otimes$ respectively correspond to a multiplication and an exponentiation (modulo $n^2$) in the ciphertext space $Z_{n^2}$.

Other cryptosystems also satisfy the properties (3) and (4), in particular the Fan-Vercauteren and Regev cryptosystems.

Regardless of the cryptosystem chosen, the user wishing to obtain the record O(i) of the database builds the following vector:

$$V_i = (Enc(0,r_1), \ldots, Enc(1,r_i), \ldots, Enc(0,r_N))^T \quad (10)$$

where $r_1, \ldots, r_N$ are results from the drawing of the random variable r. The elements of the vector $V_i$ are consequently all ciphertexts of 0 except for an element in position i which is a ciphertext of 1.

The vector $V_i$ is transmitted as a request to the server of the service provider. This is incapable of discerning in the vector $V_i$ the element which corresponds to the ciphertext of 1.

Then, the server performs the scalar product:

$$C_i = \langle O, V_i \rangle = \bigoplus_{k=1}^{N}(O_k \otimes Enc(\delta_{k-i}, r_k)) \quad (11)$$

where $\delta_{k-i}=1$ if k=i and $\delta_{k-i}=0$ and returns the result $C_i$, which is a ciphertext, to the user. The same performs the decryption:

$$m_i = Dec(C_i) \quad (12)$$

that is, successively using the homomorphic properties (4) and (5) of the cryptosystem:

$$m_i = \sum_{k=1}^{N} Dec(Enc(\delta_{k-i}, r_k) \otimes O_k) = \sum_{k=1}^{N} \delta_{k-i} O_k = O_i. \quad (13)$$

It is thus understood that the user is capable of retrieving thereby the plaintext record, $O_i$, of the database without, at any time, it being possible for the server which record is.

Figure 2:
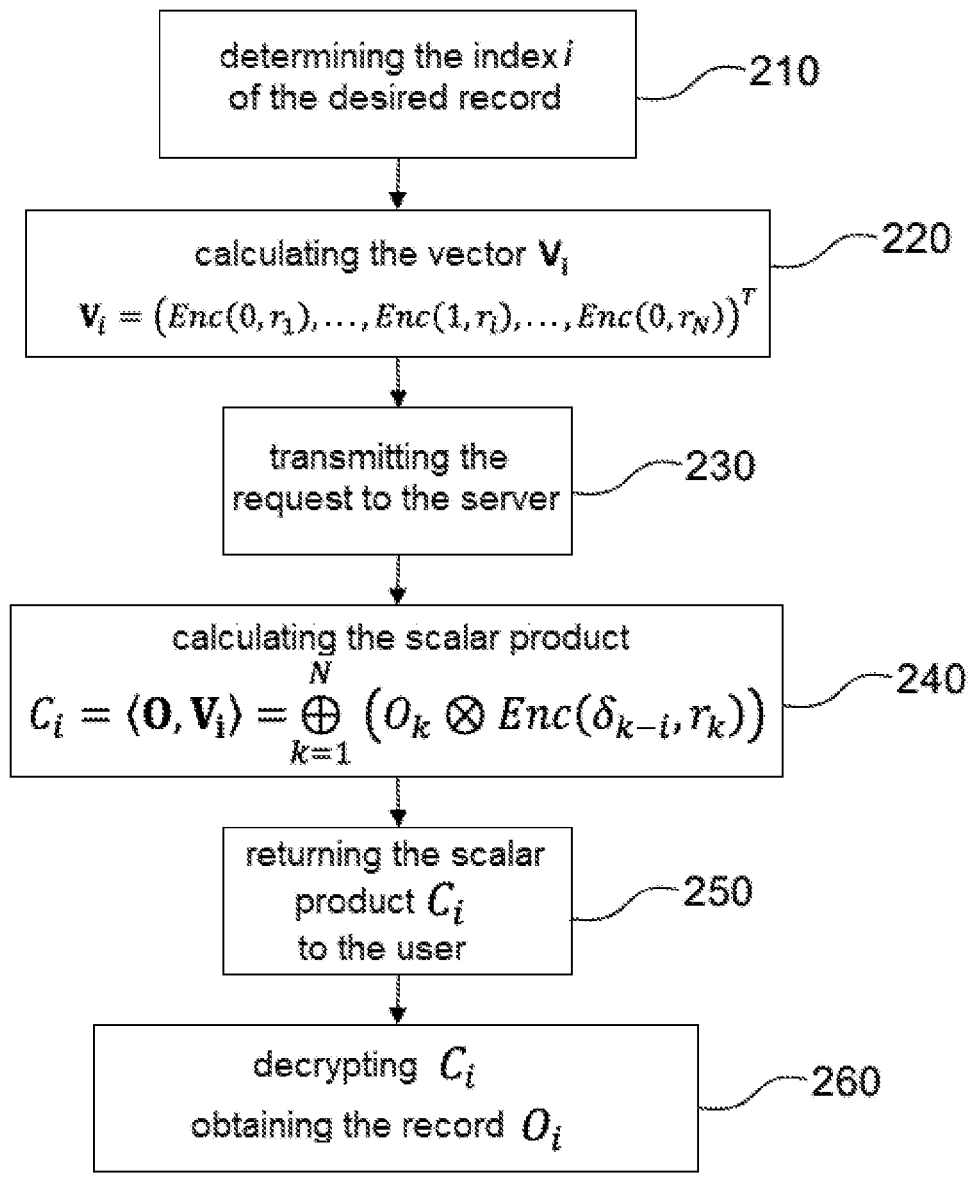
FIG. 2 represents a flowchart of the PIR method according to one embodiment of the invention.

FIG. 2 schematically represents a flowchart of the confidential querying method (PIR) used in the present invention.

In step 210, the user determines the index i of the record he/she wishes to obtain in the database of the server.

In step 220, the user encrypts N−1 times the null value $Enc(0,r_k)$, k=1, . . . , N, k≠i and once the value 1, $Enc(0,r_i)$. He/she builds the vector $V_i$ defined by (10).

In step 230, the user transmits to the server of the service provider, his/her request having the vector $V_i$ as an argument.

In step 240, the server performs, according to the expression (11), the scalar product $C_i$ of the vector O having the records of the database as elements with the vector $V_i$ received from the user.

In step 250, the server returns the ciphertext result $C_i$ to the user.

In step 260, the user decrypts the encrypted result $C_i$ to obtain the plaintext record $O_i$.

The confidential querying method of the present invention enables a user to cause a server to evaluate a function F(a) where a is a secrete data of the user and where F is a function known to the server. Indeed, the server can calculate, or cause to calculate by a third party entity, the list of values $F(a_i)$, i=1, . . . , N taken by the function F on the set $A=\{a_i | i=1, \ldots, N\}$ of the possible discrete values of a. The set A is ordered and the order relationship is known both from the user and from the server. The records of the database consist of the values $F(a_i)$, i=1, . . . , N.

When the user wishes to obtain the value taken by the function F in $a_i$, it is sufficient for him/her to transmit a request having the vector $V_i$ as an argument to the server, according to the method of FIG. 2. The server then returns the scalar product $C_i$ to him/her, which is decrypted by the user to retrieve the value $F(a_i)$.

In particular, the values $a_i$ can be possible positions of a user and the function F be that of a location-based service. For example, $F(a_i)$ can yield the list of points of interest (POI) closest to the point of position $a_i$.

The present invention is advantageously applicable to a confidential navigation method in that the routes are concealed to the server. More precisely, such a navigation enables a user to obtain an optimum route, for the purposes of some criterion, between a starting point and an arrival point without revealing to the navigation server neither the starting point, nor the arrival point, nor the route in question. In other words, all the navigation data (starting point, list of passage points defining the route, arrival point) remain perfectly confidential.

To do this, the navigation server calculates or causes to calculate by a third party, all the optimum paths, for the purpose of some criterion, between each couple of reference points of the geographical area of interest. The criterion can be for example a minimum distance or a minimum travel time (as a function in particular of traffic conditions). The calculation uses a representation of the road network of the geographical area as a valued graph the apices of which are the reference points in question and the ridges of which have distances or travel times as weights. Searching for the optimum path between a starting point and an arrival point amounts thereby to searching for that of a lowest weight path in the graph in question. This problem is well known in graph theory and several algorithms enable it to be efficiently solved, in particular the Dijkstra algorithm or Floyd-Warshall algorithm. The Floyd-Warshall algorithm will be preferably used, enabling all the shortest paths for all the pairs of apices of the graph to be calculated at once.

If it is assumed that the graph has P vertices, the previous search yields N=P(P−1) paths for all the couples of points of the graph (it is generally supposed that the graph is oriented and that the weights of the edges with opposite directions between two points can differ from each other). The points of the geographical area are indexed and the couples of vertices of the graph are ordered according to a total order relationship, for example a lexicographic order. The couples are arranged in the database as an ordered list according to this order relationship, a record relating to each couple of points of the list containing, in a coded form, the list of points defining the optimum path between the first and second points of this couple. Optionally, the record will also contain the weight of the optimum path (minimum distance or minimum travel time). Thus, if the points of the geographical area are indexed, a record relating to a couple $(i_A, i_B)$ can consist of a list of indices $k_1, \ldots, k_Q$ of points defining the path between the starting point A, of index $i_A$, and the destination point B of index $i_B$. The indices $k_1, \ldots, k_Q$ could be separated using a predetermined separating character and the list of indices could be advantageously coded by means of a source coding, so as to reduce the length of the records.

It is to be noted that the database is generally dynamic, in particular when the navigation is performed according to a criterion of minimum travel time. In this case, a network of sensors deployed along the road network enables the traffic state to be determined and the travel times relating to the different ridges of the graph to be updated. The server or third party entity performs a calculation of the optimum paths in the graph regularly or upon request and updates the database accordingly.

Figure 3:
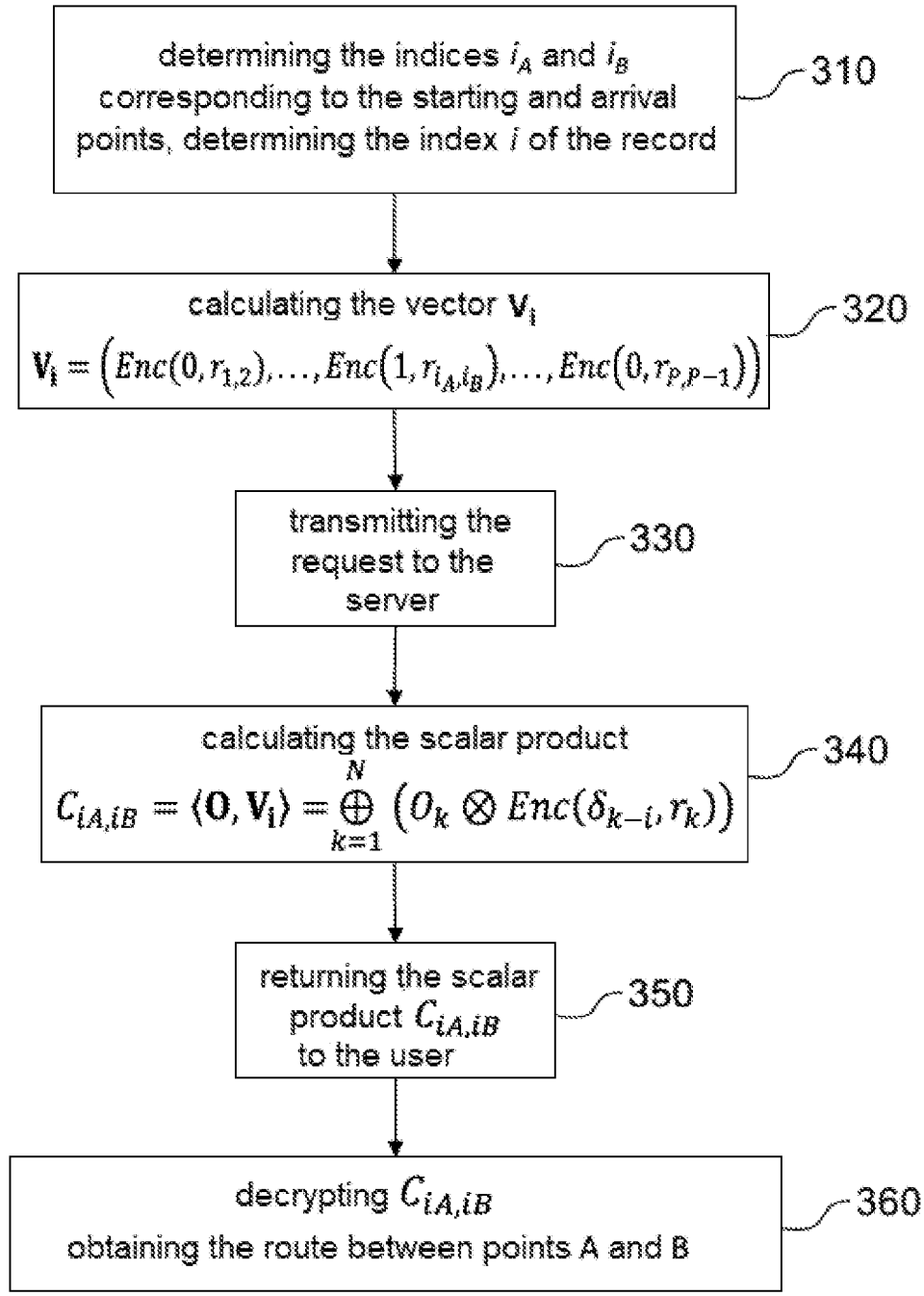
FIG. 3 represents a flowchart of a navigation with concealed routes using the PIR method of FIG. 2.

FIG. 3 schematically represents a flowchart of a method of navigation with concealed routes using the confidential querying method of FIG. 2.

In step 310, the user determines the couple of indices $(i_A, i_B)$ respectively indexing the starting point A and the destination point B of the desired route, and deduces the index i of the record containing the optimum path between both these points therefrom.

In step 320, the user encrypts N−1 null values with N=P(P−1), that is $\text{Enc}(0, r_{\mu,\nu})$ with $\mu=1, \ldots, P; \nu=1, \ldots, P$; $\mu \neq \nu$ and $(\mu,\nu) \neq (i_A, i_B)$, and a value 1, that is $\text{Enc}(1, r_{i_A, i_B})$, where the $r_{\mu,\nu}$ are random numbers. The user then forms a vector of the size N=P(P−1), that is $V_i = (\text{Enc}(0, r_{1,2}), \ldots, \text{Enc}(1, r_{i_A, i_B}), \ldots, \text{Enc}(0, r_{P,P-1}))$, the order of the elements being a total order relationship of the pairs $(\mu,\nu)$, for example the lexicographic order, the index i being the index associated with the pair $(i_A, i_B)$ according to this order.

In step 330, the user transmits a request having the vector $V_i$ as an argument to the server.

In step 340, the server calculates the scalar product $C_{i_A, i_B} = C_i$ between the vector O the elements of which are the records of the database (here the optimum paths) and the vector $V_i$ received from the user.

In step 350, the server returns the encrypted result $C_{i_A, i_B}$ to the user.

In step 360, the user decrypts $C_{i_A, i_B}$ and obtains the list of indices $k_1, \ldots, k_Q$ of the points of the geographical area defining the optimum route between points A and B.

Thereby, it is understood that at any moment, the server has no knowledge of points A and B (that is of the indices $i_A, i_B$) and consequently of the user's route between these points. The user's route is thus concealed to the server.

When the number P of reference points of the geographical area is high (in other words the number of apices of the navigation graph is high), the vector O is of a very large size. In order to reduce the size thereof, the user can indicate to the server a sub-region in which the points A and B are located.

Further, the user can record in the server a list of requests corresponding to his/her pairs of favourite starting and destination points. These requests are reflected by a list of favourite vectors $V_1$. The server can thereby periodically calculate the scalar product $C_i$ for the favourite vectors $V_i$ of the list in question.

The scalar products $C_i$ can themselves be considered as elements of a vector C of a size M substantially smaller than that of the vector O. Thereby, it is sufficient to the user to send a sub-request, encrypted according to the same principle as previously, and making it possible to specify from the favourite request that desired to obtain the route thereof.

More precisely, the user builds a vector $U_j = (\text{Enc}(0, r_1), \ldots, \text{Enc}(1, r_j), \ldots, \text{Enc}(0, r_M))^T$ where M is the plurality of pairs of favourite starting and destination points. Then, the server calculates a second scalar product between the vector C and the vector $U_j$ and returns the result to the user. The user decrypts the second scalar product $\langle C, U_j \rangle$ to obtain the first scalar product $C_i$, and then decrypts the first scalar product to obtain the record $O_i$. The second scalar product enables a confidential extraction of the optimum paths to be performed for all the couples of favourite starting and destination points, and the first scalar product then enables from the optimum paths thus extracted, the route relating to the desired couple of points from the couples of favourite points to be extracted.

It is understood that the server has no knowledge of the pairs of favourite starting and destination points and a fortiori no knowledge of that for which he/she desires to obtain the optimum route.

The navigation method thus makes it possible to have a great ease of use with a very high confidentiality level.

The invention claimed is:

1. A confidential navigation method of a user within a given geographical area, by confidentially querying a server including a database,
wherein the geographical area includes a plurality of reference points, each couple of reference points being associated with an index;
the database includes for each index corresponding to a couple of reference points, a record of an optimum path as a predetermined criterion between these points, the optimum path being defined by a list of indices of reference points $(k_1, \ldots, k_Q)$ through which this path passes; the method comprising:
the user determining respective indices $(i_A, i_B)$ of a couple including a starting point, A, and a destination point, B, and deducing an index i corresponding to the couple (A, B) therefrom;
the user building a vector $V_1$ in which all elements except for that of the index i are ciphertexts of zero and the element of index i of which is a ciphertext of one, encryption being made by a probabilistic cryptosystem satisfying following homomorphic properties:

$$\text{Dec}_{sk}[\text{Enc}_{pk}(a,r) \oplus \text{Enc}_{pk}(b,r)] = a+b$$

$$\text{Dec}_{sk}[a \otimes \text{Enc}_{pk}(b,r)] = a \cdot b$$

wherein (sk, pk) is a pair of private and public keys of the user, $\text{Enc}_{pk}$ is an encryption operation by the public key, $\text{Dec}_{sk}$ is a decryption operation using the private key, a,b are plaintexts, $\oplus$ is an operator on ciphertext space, and $\otimes$ is an operator between plaintext space and the ciphertext space;
the user transmitting a request having the vector $V_i$ as an argument to the server;
the server performing a scalar product between a record vector O and the vector $V_i$ and returning a scalar product $C_i$ thus obtained to the user;

the user decrypting the scalar product $C_i$ to obtain the record of index i of the database, the record giving an optimum path between points A and B.

2. The confidential navigation method according to claim 1, wherein the cryptosystem is a cryptosystem chosen from a Paillier cryptosystem, a Regev cryptosystem, and a Fan-Vercauteren cryptosystem.

3. The confidential navigation method according to claim 1, wherein the server updates, periodically or upon request, the optimum paths stored in the database between the reference points of the geographical area.

4. The confidential navigation method according to claim 3, wherein the server stores a plurality of vectors $V_i$ relating to a plurality M of couples, each including a starting point and a destination point.

5. The confidential navigation method according to claim 4, wherein the user transmits to the server a sub-request specifying from the plurality M of couples, the couple for which the user desires to obtain a route and the server returns the scalar product between the record vector O and the vector $V_i$ corresponding to this sub-request.

6. The confidential navigation method according to claim 4, wherein the server periodically performs a scalar product calculation between the vectors $V_i$ relating to the plurality M of couples and the record vector O, the server building a vector C of the scalar products thus obtained.

7. The confidential navigation method according to claim 6, wherein the user builds a second vector $U_j$ of size M, all elements of which except for an element of an index j are ciphertexts of zero and the element of index j is a ciphertext of one, encryption being made by the cryptosystem, the user transmits a sub-request having the second vector $U_j$ as an argument to the server.

8. The confidential navigation method according to claim 7, wherein the server performs a second scalar product between the vector C and the second vector $U_j$ and returns the second scalar product thus obtained to the user.

9. The confidential navigation method according to claim 8, wherein the user decrypts the second scalar product to obtain the scalar product $C_i$, and then decrypts the first scalar product $C_i$ to obtain a requested route.

* * * * *